United States Patent
Kato

(10) Patent No.: US 10,887,506 B2
(45) Date of Patent: Jan. 5, 2021

(54) IMAGE INSPECTION DEVICE, IMAGE INSPECTION METHOD AND COMPUTER READABLE RECORDING MEDIUM

(71) Applicant: OMRON Corporation, Kyoto (JP)

(72) Inventor: Yutaka Kato, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/248,798

(22) Filed: Jan. 16, 2019

(65) Prior Publication Data

US 2019/0289196 A1 Sep. 19, 2019

(30) Foreign Application Priority Data

Mar. 13, 2018 (JP) .................................. 2018-044957

(51) Int. Cl.
*H04N 5/232* (2006.01)
*G06T 7/00* (2017.01)
(Continued)

(52) U.S. Cl.
CPC ........ *H04N 5/23216* (2013.01); *B25J 9/1664* (2013.01); *B25J 9/1679* (2013.01); *B25J 9/1697* (2013.01); *G01N 21/8806* (2013.01); *G01N 21/9515* (2013.01); *G05B 19/05* (2013.01); *G06T 7/0002* (2013.01); *G01N 21/952* (2013.01); *G01N 21/954* (2013.01); *G01N 2021/845* (2013.01); *G01N 2021/9518* (2013.01); *G05B 2219/1213* (2013.01); *G05B 2219/39001* (2013.01);
(Continued)

(58) Field of Classification Search
CPC .. H04N 5/23216; H04N 5/2256; G06T 7/002; G06T 2207/10148; G06T 2207/10144; G06T 2207/10152; G05B 19/05; B25J 9/1697

USPC .......................................................... 348/91
See application file for complete search history.

(56) References Cited

U.S. PATENT DOCUMENTS 4,776,466 A * 10/1988 Yoshida ................ B07C 5/3408
209/565
5,216,481 A * 6/1993 Minato .............. G01N 21/8806
356/239.1
(Continued)

FOREIGN PATENT DOCUMENTS

DE 102009058215 6/2011
JP H1160243 6/1999
(Continued)

OTHER PUBLICATIONS

"Search Report of Europe Counterpart Application", dated Aug. 21, 2019, p. 1-p. 7.

*Primary Examiner* — Zaihan Jiang
(74) *Attorney, Agent, or Firm* — JCIPRNET

(57) ABSTRACT

An image inspection device which inspects the inspection target by images includes: an imaging part, which images the inspection target; a changing part, which makes the location of the inspection target with respect to the imaging part periodically and relatively change; and a control part, which makes the imaging part image the inspection target so as to acquire a plurality of images having different imaging conditions at a plurality of timings which is periodically repeated due to the relative changes and at which the inspection target is in a predefined location with respect to the imaging part.

11 Claims, 8 Drawing Sheets

(51) Int. Cl.
  *G05B 19/05*   (2006.01)
  *B25J 9/16*    (2006.01)
  *G01N 21/88*   (2006.01)
  *G01N 21/95*   (2006.01)
  *H04N 5/225*   (2006.01)
  *G01N 21/84*   (2006.01)
  *G01N 21/952*  (2006.01)
  *G01N 21/954*  (2006.01)

(52) U.S. Cl.
  CPC ......... *G06T 2207/10144* (2013.01); *G06T 2207/10148* (2013.01); *G06T 2207/10152* (2013.01); *H04N 5/2256* (2013.01)

(56) References Cited

U.S. PATENT DOCUMENTS

| | | | | |
|---|---|---|---|---|
| 5,305,391 | A * | 4/1994 | Gomibuchi | G01N 21/8851 250/223 B |
| 5,444,237 | A * | 8/1995 | Takizawa | G01N 21/9018 250/223 B |
| 5,793,901 | A * | 8/1998 | Matsutake | G06T 7/75 382/151 |
| 6,034,766 | A * | 3/2000 | Sugiura | G01M 11/0242 356/124 |
| 6,393,141 | B1 * | 5/2002 | Cronshaw | G01N 21/952 382/141 |
| 2002/0093647 | A1 * | 7/2002 | Fukazawa | G01N 21/956 356/237.1 |
| 2004/0179727 | A1 * | 9/2004 | Takeuchi | G06T 7/0004 382/145 |
| 2007/0216896 | A1 * | 9/2007 | Chikamatsu | G01N 21/9501 356/237.2 |
| 2009/0195648 | A1 | 8/2009 | Thomas et al. | |
| 2012/0242842 | A1 * | 9/2012 | Yoshigahara | G06K 9/78 348/207.1 |
| 2015/0060661 | A1 * | 3/2015 | Ikeda | H01J 37/28 250/307 |
| 2016/0231555 | A1 * | 8/2016 | Freifeld | H04N 5/2256 |
| 2016/0300107 | A1 * | 10/2016 | Callegari | G06T 7/38 |
| 2018/0106728 | A1 * | 4/2018 | Hayashi | G01N 21/57 |
| 2018/0158223 | A1 * | 6/2018 | Kobayashi | F01D 21/003 |
| 2019/0170665 | A1 * | 6/2019 | Kaneko | G01N 23/04 |
| 2019/0308762 | A1 * | 10/2019 | Suzuki | G01N 21/90 |
| 2020/0120268 | A1 * | 4/2020 | Osawa | H04N 5/225 |

FOREIGN PATENT DOCUMENTS

| | | |
|---|---|---|
| JP | 2010175281 | 8/2010 |
| NL | 1003277 | 12/1997 |

* cited by examiner

IMAGE INSPECTION DEVICE, IMAGE INSPECTION METHOD AND COMPUTER READABLE RECORDING MEDIUM

CROSS-REFERENCE TO RELATED APPLICATION

This application claims the priority benefit of Japan Application No. 2018-044957, filed on Mar. 13, 2018. The entirety of the above-mentioned patent application is hereby incorporated by reference herein and made a part of this specification.

BACKGROUND

Technical Field

The disclosure relates to an image inspection device, an image inspection method and an image inspection program.

Related Art

In recent years, for automation or labour-saving of an inspection in a production line, an image inspection device which carries out an appearance inspection of a product by images is used extensively (for example, see patent literatures 1-2). Although there are various types or approaches of the appearance inspection, a basic configuration is to carry out a target inspection (for example, a judgment of good/bad, an assortment, and an information acquisition or the like) by photographing an inspection target by an imaging device built-in an image sensor, extracting a section which is an inspection region from obtained images, and analysing and evaluating features of images of the section of the inspection region.

In the image inspection of this type, a plurality of images of the inspection target may be acquired while maintaining a location relationship between the inspection target and the imaging device and only changing other imaging conditions, and the images with different imaging conditions are used to carry out the image inspection. For example, in the image inspection using an illumination difference stereo method, in a state of maintaining the location relationship between the inspection target and the imaging device, a plurality of images of the inspection target are acquired while switching a location of a lighting that illuminates the inspection target. In addition, in the image inspection using a phase shift method, in the state of maintaining the location relationship between the inspection target and the imaging device, a plurality of images of the inspection target are acquired while changing a phase of a fringe pattern irradiated to the inspection target. In addition, in the image inspection using a high-dynamic-range rendering, in the state of maintaining the location relationship between the inspection target and the imaging device, a plurality of images of the inspection target is acquired while changing an exposure time at the time of imaging the inspection target. In addition, in the image inspection using focus processing, in the state of maintaining the location relationship between the inspection target and the imaging device, a plurality of images of the inspection target are acquired while changing a focus location of a lens of the imaging device.

LITERATURE OF RELATED ART

Patent Literature

[Patent literature 1] Japanese Laid-Open No. 2010-175281
[Patent literature 2] Japanese Laid-Open No. 11-160243

In an image inspection, it is necessary to image an inspection target flowing through a production line from various directions. Therefore, for example, if an appearance of the inspection target is required to be inspected over a whole periphery, it is necessary to prepare a plurality of imaging devices to surround the inspection target, or to image the inspection target while changing a location of the imaging device with respect to the inspection target. However, when the inspection target is surrounded by the imaging devices, a procurement cost of the imaging devices is increased, and it is also difficult to surround the inspection target which is maintained in a state of flowing through the production line by the imaging devices. Therefore, it is desirable to image the inspection target while changing an orientation of the inspection target. However, for example, when a rotation mechanism which makes the inspection target rotate 90 degrees at a time is used, activation and stop of a drive motor of the rotation mechanism need to be repeated at least more than 4 times, and thus it takes a comparatively long time to image the appearance of the inspection target over the whole periphery. In addition, when the imaging device is moved around the inspection target, activation and stop of a mechanism which moves the imaging device need to be repeated, and thus it also takes a comparatively long time to image the appearance of the inspection target over the whole periphery.

Therefore, when the inspection target is rotated by the rotation mechanism, it is also considered, for example, to take images in a state of keeping the inspection target rotating, and acquire images which are obtained by imaging the inspection target from various directions. In addition, when the imaging device is moved around the inspection target, it is also considered, for example, to take images in a state of keeping the image device moving, and acquire the images which are obtained by imaging the inspection target from various directions. However, if the imaging device and the inspection target continue to move relatively, the location relationship between the inspection target and the imaging device is not kept, and thus the illumination difference stereo method or the like as described above, in which a plurality of images of the inspection target are acquired while only changing other imaging conditions in a state of maintaining the location relationship between the inspection target and the imaging device, are difficult to be applied to the image inspection.

Therefore, the application discloses a technology, which can take images in a state that the location of the inspection target with respect to the imaging device is kept changing in the image inspection in which a plurality of images of the inspection target are acquired while only changing other imaging conditions in a state of maintaining the location relationship between the inspection target and the imaging device.

SUMMARY

Specifically, the embodiments of the disclosure provide an image inspection device which inspects an inspection target by images and includes: an imaging part, which images the inspection target; a changing part, which makes a location of the inspection target with respect to the imaging part periodically and relatively change; and a control part, which makes the imaging part image the inspection target so as to acquire a plurality of images having different imaging conditions at a plurality of timings which is periodically repeated due to the relative changes and at which the inspection target is in a predefined location with respect to the imaging part.

Furthermore, the embodiments of the disclosure may also be understood from aspects of a method and a program. For example, the embodiments disclosure may also provide an image inspection method which inspects an inspection target by images and includes: a changing process, in which a location of the inspection target with respect to an imaging part which images the inspection target is periodically and relatively changed; and a control process, in which the imaging part is made to image the inspection target so as to acquire a plurality of images having different imaging conditions at a plurality of timings which is periodically repeated due to the relative changes and at which the inspection target is in a predefined location with respect to the imaging part.

DESCRIPTION OF THE EMBODIMENTS

Figure 1:
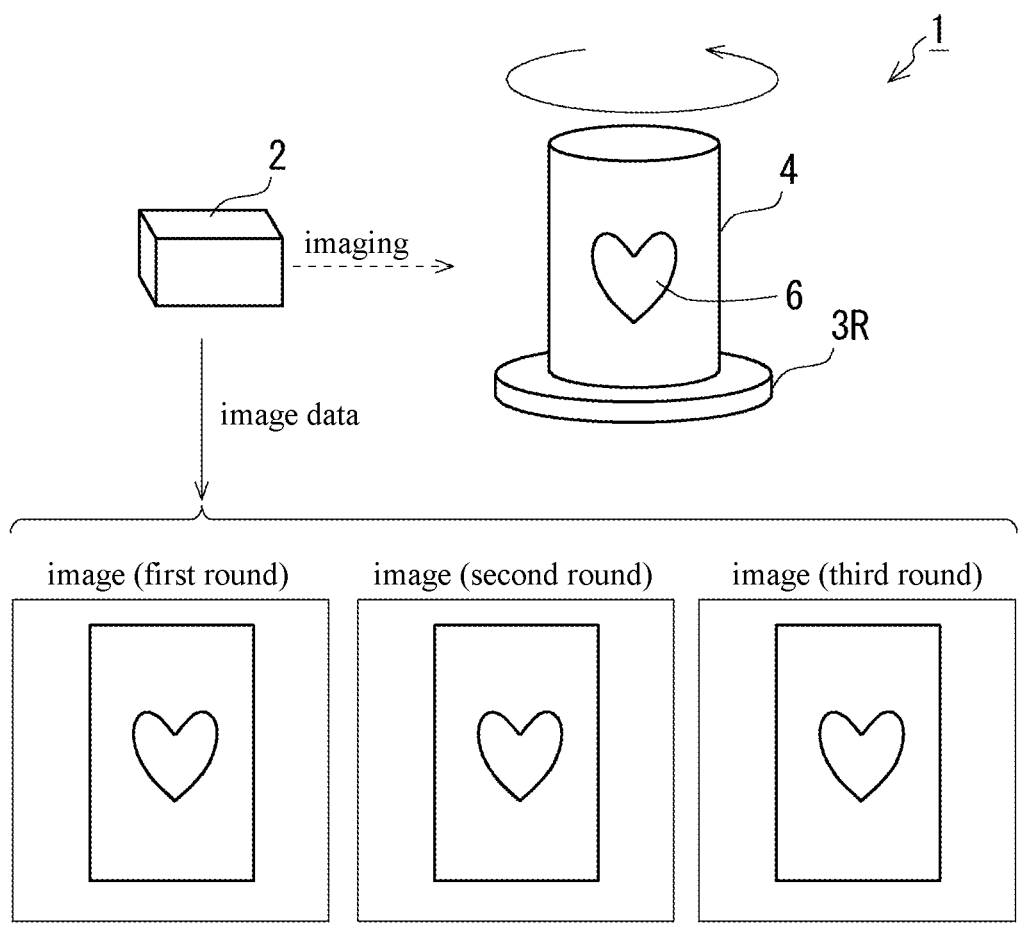
FIG. 1 is a schematic diagram showing one example of an action realized by an image inspection device of an embodiment.

In the embodiments of the disclosure, the images are taken in a manner that a plurality of images having different imaging conditions is acquired at a plurality of timings which is periodically repeated due to the periodical and relative change of the location of the inspection target with respect to the imaging part and at which the inspection target is in a predefined location with respect to the imaging part.

Specifically, the embodiments of the disclosure provide an image inspection device which inspects an inspection target by images and includes: an imaging part, which images the inspection target; a changing part, which makes a location of the inspection target with respect to the imaging part periodically and relatively change; and a control part, which makes the imaging part image the inspection target so as to acquire a plurality of images having different imaging conditions at a plurality of timings which is periodically repeated due to the relative changes and at which the inspection target is in a predefined location with respect to the imaging part.

Here, the inspection target is an object which can be a target of the image inspection by the image inspection device, for example, an industrial product or its parts flowing through a production line, an industrial production or its parts recycled from the market, a harvested agricultural product or a captured marine product, and various other objects can be listed.

In addition, the location of the inspection target with respect to the imaging part is a concept including not only a distance between the imaging part and the inspection target, but also an orientation of the inspection target with respect to the imaging part.

In addition, the predefined location is the location of the inspection target with respect to the imaging part at the time when the imaging part takes the images used in the inspection, for example, one or a plurality of locations on a track of the inspection target which is periodically and relatively changed with respect to the imaging part is listed.

In addition, the imaging conditions are conditions which can make the images of the inspection target taken by the imaging part change in the state of maintaining the location relationship between the inspection target and the imaging part, for example, a state of the illumination, a setting of image elements, or a state of the lens or the like is listed.

In the image inspection device, the images of the inspection target are taken in a state that the location of the inspection target with respect to the imaging part is periodically and relatively changed by the changing part. The images are taken at the timings which are repeated for a plurality of times in accordance with the periodic and relative changes caused by the changing part and at which the location relationship of the inspection target with respect to the imaging part is the same. Besides, the imaging at each timing is carried out while changing the imaging conditions.

Therefore, according to the image inspection device, the plurality of images in which the imaging conditions are changed while maintaining the location relationship between the inspection target and the imaging part can be acquired in a state that the location of the inspection target with respect to the imaging part continues to change periodically and relatively. Furthermore, the images acquired by the image inspection device may also be a plurality of images having the same imaging conditions instead of the images having totally different imaging conditions.

Meanwhile, after the control part makes the imaging part image the inspection target so as to acquire a first image which captures the inspection target in the relative changes, when the location of the inspection target with respect to the imaging part is the same predefined location as the time when the first image is taken, the control part may make the imaging part image the inspection target photographed by so as to acquire a second image which captures the inspection target in the relative changes in imaging conditions different from the conditions under which the first image is taken. If the control part carries out such control, after the first image is acquired, the second image is acquired at the timing at which the location of the inspection target with respect to the imaging part is the same as the time when the first image is taken, so that the plurality of images can be rapidly acquired.

In addition, the changing part can also make the location of the inspection target with respect to the imaging part periodically and relatively change by making the inspection target rotate. If the location of the inspection target with respect to the imaging part is changed due to the rotation of the inspection target, the periodic and relative changes can be realized only by continuously rotating the inspection target in a fixed direction, and thus the changing part can be easily configured.

In addition, the changing part can also output signals showing the location of the inspection target with respect to the imaging part, and the control part can also make the imaging part image the inspection target so as to acquire the plurality of images having different imaging conditions at the timings determined based on the signals output by the changing part. If the signals output by the changing part are used, an arrival of the predefined location can be precisely detected, and thus the plural pieces of images of the inspection target in which only the imaging conditions are changed in the state of maintaining the location relationship between the inspection target and the imaging part can be precisely obtained.

In addition, an inspection part which inspects the inspection target using the plurality of images acquired by the imaging part may be further included. If such an inspection part is included in the image inspection device, the plurality of images in which only the imaging conditions are changed in the state of maintaining the location relationship between the inspection target and the imaging part is rapidly acquired, and thus the image inspection can be rapidly carried out.

In addition, the imaging conditions may include at least any one of an irradiation pattern for lightings, a focus location of a lens of the imaging part, and an exposure time of the imaging part. Here, the irradiation pattern of the lightings is not limited to a shape of a light emission portion on a light emission surface, and may be, for example, a light emission intensity distribution (a brightness distribution) on the light emission surface of the lightings, or be an illumination distribution on a target surface illuminated by the lightings. If such imaging conditions are changed and the plurality of images are acquired in the state of maintaining the location relationship between the inspection target and the imaging part, the images required for the image inspection can be obtained.

Furthermore, the embodiments of the disclosure may also be understood from aspects of a method and a program. For example, the embodiments disclosure may also provide an image inspection method which inspects an inspection target by images and includes: a changing process, in which a location of the inspection target with respect to an imaging part which images the inspection target is periodically and relatively changed; and a control process, in which the imaging part is made to image the inspection target so as to acquire a plurality of images having different imaging conditions at a plurality of timings which is periodically repeated due to the relative changes and at which the inspection target is in a predefined location with respect to the imaging part.

According to the image inspection device, the image inspection method and the image inspection program described above, images can be taken in a state that the location of the inspection target with respect to the imaging device is kept changing in the image inspection in which the plurality of images of the inspection target are acquired while only changing other imaging conditions in the state of maintaining the location relationship between the inspection target and the imaging device.

Application Example

FIG. 1 is a schematic diagram showing one example of an action realized by an image inspection device 1 of an embodiment. As shown in FIG. 1, the image inspection device 1 includes, for example, a camera 2 (one example of an "imaging part" in the application) and a rotation mechanism 3R (one example of a "changing part" in the application) as a main configuration. The camera 2 acquires images used in an inspection of an inspection target 4. The rotation mechanism 3R is a device making the installed inspection target 4 rotate, and operates according to a control signal sent from a control device not illustrated. Therefore, the camera 2 can image the inspection target 4 from various directions during the operation of the rotation mechanism 3R. Furthermore, a lighting which illuminates the inspection target 4 may be integrated with the camera 2 or be separated from the camera 2.

Data of the images obtained by the camera 2 imaging the inspection target 4 is sent to an unillustrated image processing unit which is provided on the image inspection device 1. In the image processing unit, an appearance inspection of the inspection target 4, which uses the data of the images sent from the camera 2, is carried out. The inspection target 4 of which the appearance inspection is carried out by the image processing unit is sent to the next process. The appearance inspection of the inspection target 4 carried out by the image processing unit includes, for example, a surface shape of the inspection target 4, presence or absence of a concave-convex defect such as a dent generated by a collision of articles or the like to the inspection target 4, presence or absence of a defect of colour generated by malfunction in a surface processing such as coating or the like, presence or absence of adhesion of foreign matters, and various other inspection items. Furthermore, on an occasion of the defect inspection, the defect may be dealt with easily or be irreparable. For example, if the defect detected by the appearance inspection of the inspection target 4 using the images is merely the adhesion of foreign matters, the defect can be easily eliminated by of a removal the foreign matters. Therefore, when the defect inspection is carried out by the image inspection device 1, a destination of the inspection target 4 inspected by the image inspection device 1 may be switched corresponding to types of the defects that are found.

In the image inspection device 1 thus configured, for example, imaging of the inspection target 4 is carried out in a state that the inspection target 4 is rotated by the rotation mechanism 3R. The imaging is carried out at timings which are repeated for a plurality of times in accordance with the rotation of the inspection target 4 caused by the rotation mechanism 3R, and at which orientation of the inspection target 4 with respect to the camera 2 is the same. For example, in the example shown in FIG. 1, the imaging is carried out every time a mark 6 on the inspection target 4 faces a direction of the camera 2, and a plurality of images capturing the mark 6 is acquired. Imaging conditions are changed to carry out the imaging which is carried out every time the mark 6 on the inspection target 4 faces the direction of the camera 2 due to the rotation caused by the rotation mechanism 3R. For example, in the image inspection which uses an illumination difference stereo method carried out by rendering 3 pieces of images, as the imaging condition at the timing of each imaging when the 3 pieces of images are acquired, a light source which emits a light is changed for each imaging so as to change a direction of the light illuminating the inspection target 4. Such imaging is carried out not only at the timing when the mark 6 faces the direction of the camera 2, but also at timings when the mark 6 faces other directions, by which an image inspection over a whole periphery of the inspection target 4 is realized.

When a thorough image inspection to the inspection target 4 is required, it is necessary to image the inspection target 4 from various directions. Therefore, for example, when the appearance of the inspection target is required to be inspected over the whole periphery, it is necessary to prepare a plurality of imaging devices to surround the inspection target or to take images while changing the orientation of the inspection target. However, when the inspection target is surrounded by the imaging devices, a procurement cost of the imaging devices is increased, and it is also difficult to surround the inspection target which is maintained in a state of flowing through the production line by the imaging devices. On this point, according to the image inspection device 1, the inspection target 4 can be imaged from various directions by one camera 2, so that even if the plurality of imaging devices are not prepared, the appearance of the inspection target can be inspected over the whole periphery.

In addition, according to the image inspection device 1, the plurality of images of the inspection target are acquired while only the imaging conditions such as the location of the lighting are changed each time the mark 6 on the inspection target 4 faces the direction of the camera 2, and thus even when the image inspection such as the illumination difference stereo method which requires plural pieces of images is carried out over the whole periphery of the appearance of the inspection target 4, an activation and a stop of a drive motor of the rotation mechanism 3R are not required to be repeated. Therefore, according to the image inspection device 1, the appearance of the inspection target 4 can be inspected in a comparatively short time.

Furthermore, in the image inspection device 1, for example, a phase shift method or various other 3-dimensional measurement methods can be used. The image inspection device 1 can be used, for example, as one kind of FA equipment which is used in a production line for producing automobiles or various other industrial products.

EMBODIMENTS

Figure 2:
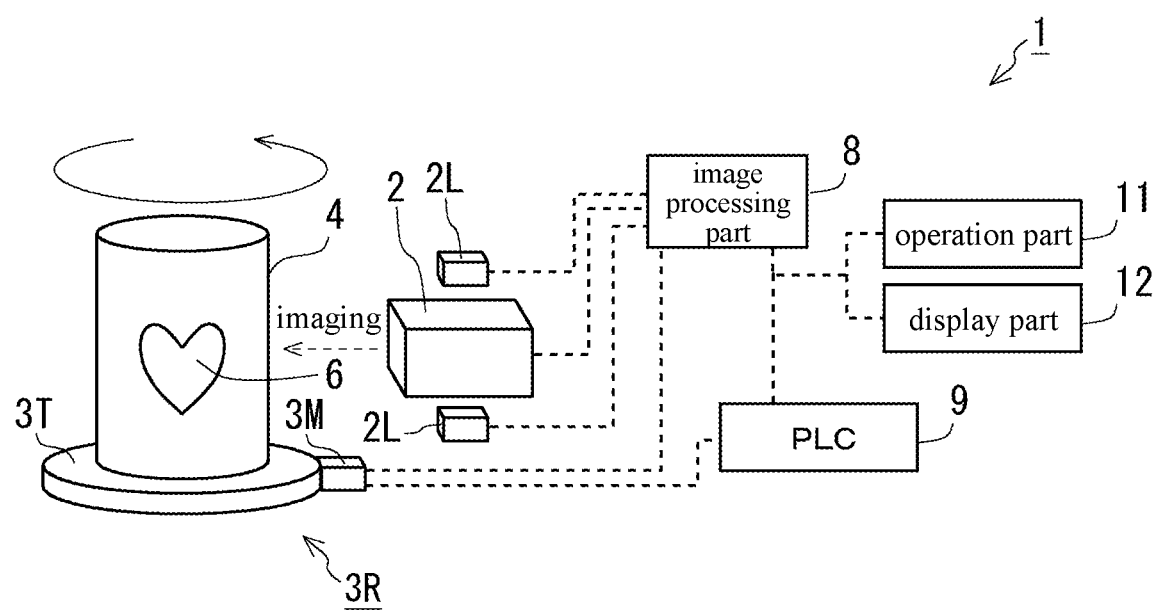
FIG. 2 is a diagram showing one example of an overall configuration of the image inspection device.

In the following, the image inspection device 1 is specifically described. FIG. 2 is a diagram showing one example of an overall configuration of the image inspection device 1. The image inspection device 1 includes, in addition to the camera 2 and the rotation mechanism 3R, an image processing unit 8 which is in charge of the processing of the image data sent from the camera 2, and a PLC 9 (one example of the "control part" in the application) which is in charge of the control of the camera 2 or the image processing unit 8 (one example of the "inspection part" in the application) (PLC: Programmable Logic Controller). The image processing unit 8 may be, for example, a general-purpose computer which has a CPU (central processing handle device), a memory, an auxiliary storage device (a hard disk drive or a solid state drive or the like), and an input device (a keyboard, a mouse, a touch panel or the like), or a device dedicated to image processing. The same applies to the PLC 9.

The camera 2 is a device that has an imaging element in which m×n light receiving elements are arranged into a matrix and that inputs colour or monochrome still images or moving images to the image processing unit 8. However, when special images (X-ray images and thermo images or the like) other than visual images are used for the inspection, a sensor in accordance with the special images may be used.

A plurality of lightings 2L are arranged in parallel in the camera 2. The lightings 2L are lighting part that illuminate the inspection target 4. Each lighting 2L may be, for example, a lighting part having a single light source or a lighting part having a plurality of light sources which can emit illumination lights (red lights, green lights and blue lights) with different wavelengths respectively at any intensity. In addition, the lightings 2L may be a lighting part illuminating lights without any shape pattern, or a lighting part illuminating lights having patterns of predefined shapes.

The rotation mechanism 3R includes a table 3T which is a so-called turntable and on which the inspection target 4 is placed, and a drive motor 3M which make the table 3T rotate. The drive motor 3M is connected to the PLC 9 and makes the table 3T rotate according to the control signal sent from the PLC 9. The drive motor 3M has a built-in encoder which outputs a rotation angle of the table 3T in an absolute value or a relative value. An output of the encoder provided on the drive motor 3M is connected to the image processing unit 8.

The image processing unit 8 is in charge of various processings of the images of the inspection target 4 taken by the camera 2 by the CPU implementing computer programs developed in the memory. In addition, the PLC 9 is in charge of the control of each portion of the image inspection device 1 by the CPU implementing the computer programs developed in the memory.

Furthermore, an operation unit 11 and a display unit 12 are provided on the image inspection device 1. The operation unit 11 is an input device which is provided in an appropriate position where an operator who operates the image inspection device 1 operates easily, and accepts various operations carried out by the operator to the image inspection device 1. The operation unit 11 may be a touch panel integrated with the display unit 12, a keyboard commonly used in a general-purpose computer, or an input device dedicatedly designed. In addition, the display unit 12 is a display device provided in an appropriate position which is easy to be seen from the operator who operates the image inspection device 1, and displays a state of each portion of the image inspection device 1 or the images acquired by the camera 2.

In the following, the processings realized in the image inspection device 1 are described.

When the image inspection is started by the image inspection device 1, the PLC 9 activates the drive motor 3M to make the table 3T rotate. If the table 3T is rotated, the inspection target 4 placed on the table 3T is also rotated, so that if the table 3T continues to rotate for plural rounds, the location of the inspection target 4 with respect to the camera 2 is periodically and relatively changed. During the rotation of the table 3T, signals of the rotation angle are output in the drive motor 3M. In the image processing unit 8, in accordance with timing of the signals of the rotation angle output from the drive motor 3M, an imaging command to the camera 2 is carried out. In the following, an action of the image inspection device 1 is described taking an occasion in which the inspection target 4 is imaged by the camera 2 every time the table 3T rotates by 90 degrees as an example.

Figure 3:
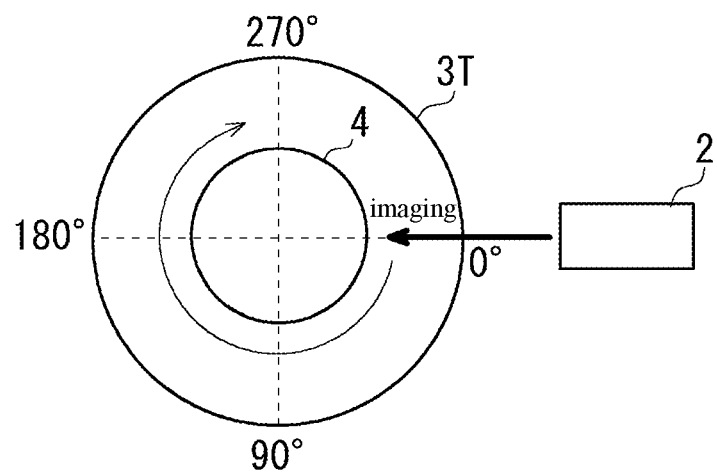
FIG. 3 is a diagram showing one example of an action realized by the image inspection device when a drive motor has an absolute encoder which outputs an absolute value of a rotation angle.
Figure 3:
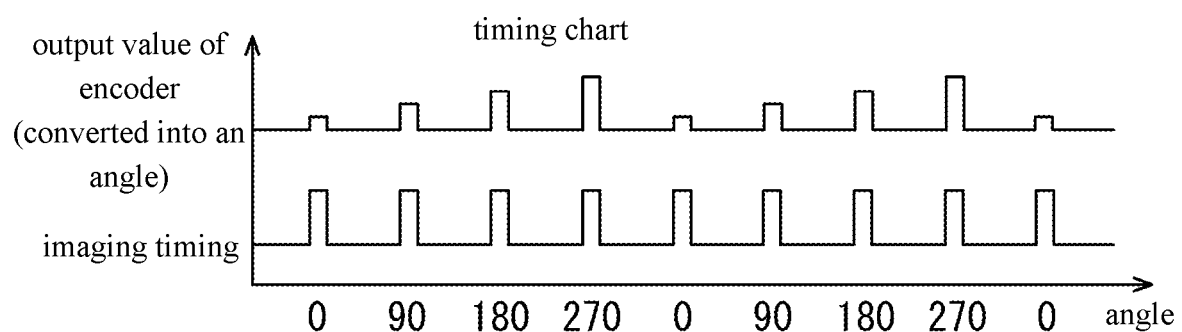
Figure 4:
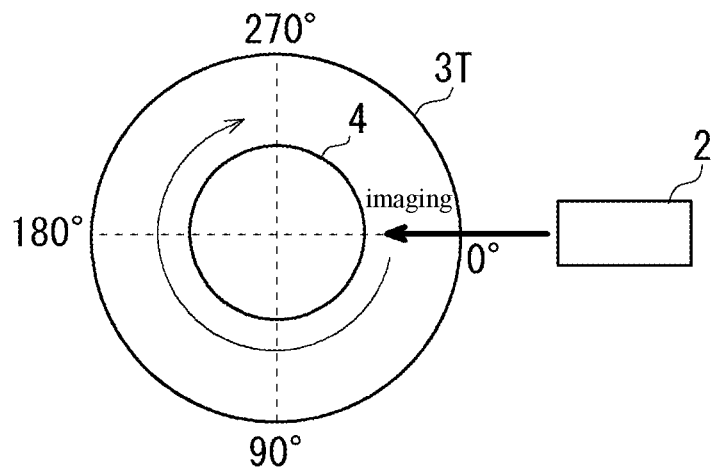
FIG. 4 is a diagram showing one example of an action realized by the image inspection device when the drive motor has an incremental encoder which outputs a relative value of a rotation angle.
Figure 4:
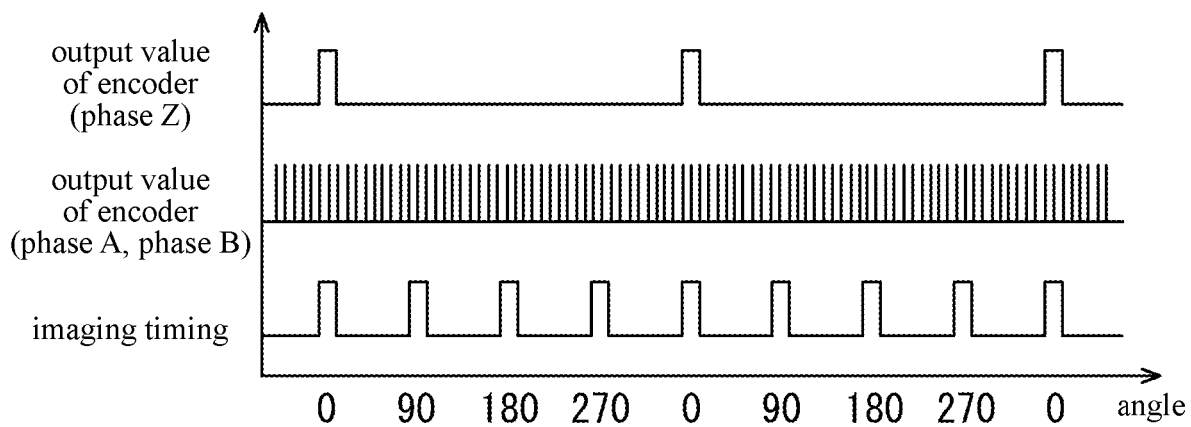

FIG. 3 is a diagram showing one example of the action realized by the image inspection device 1 when the drive motor 3M has an absolute encoder which outputs an absolute value of the rotation angle. In addition, FIG. 4 is a diagram showing one example of the action realized by the image inspection device 1 when the drive motor 3M has an incremental encoder which outputs a relative value of the rotation angle.

When the appearance of the inspection target 4 is required to be inspected over the whole periphery, for example, if the inspection target 4 is imaged by the camera 2 every time the table 3T rotates 90 degrees, 4 images in which the inspection target 4 is imaged from 4 directions of the front, back, left, and right, in other words, the images capturing the appearance of the inspection target 4 over the whole periphery, can be obtained. Therefore, in the examples shown in FIG. 3 and FIG. 4, the inspection target 4 is imaged by the camera 2 every time the table 3T rotates 90 degrees. For example, if the drive motor 3M has an absolute encoder which outputs an absolute angle with respect to a reference angle, as shown in FIG. 3, the inspection target 4 is imaged by the camera 2 at timings when angle information output by the drive motor 3M is 0 degree, 90 degrees, 180 degrees, and 270 degrees. In addition, if the drive motor 3M has an incremental encoder which outputs a relative angle, as shown in FIG. 4, the inspection target 4 is imaged by the camera 2 every time the angle, which is obtained by counting the output of phase A and phase B of the encoder which is output from the drive motor 3M, becomes 90 degrees. Besides, a counter is reset with a signal of phase Z of the encoder every time the table 3T rotates once.

When for example 3 pieces of images of the inspection target 4 in each angle are acquired, the image inspection device 1 carries out such imaging until the inspection target 4 rotates at least three times.

Then, the image processing unit 8 changes the imaging conditions of the camera 2 every time the inspection target 4 rotates once. For example, when the image inspection device 1 is applied in the illumination difference stereo method, in order to acquire 3 pieces of images that have different light source directions, the image processing unit 8 switches the lightings 2L, which emit the lights, every time the inspection target 4 rotates once. If the inspection target 4 is rotated three times while switching the lightings 2L every time the inspection target 4 rotates once, 3 pieces of images which are imaged in a state that the inspection target 4 is illuminated from various light source directions can be obtained at each angle. Therefore, normal vectors of points corresponding to each pixel can be calculated from a brightness of each pixel of the 3 pieces of images in the state that the inspection target 4 is illuminated from various light source directions. If the obtained normal vectors of each point are integrated, the shape of the inspection target 4 can be restored.

In addition, for example, when the image inspection device 1 is applied in the phase shift method, in order to acquire plural pieces of images that have different fringe patterns projected on the inspection target 4, the image processing unit 8 switches the fringe patterns projected by the lightings 2L every time the inspection target 4 rotates once. If the inspection target 4 is rotated for plural rounds while switching the fringe patterns of the lightings 2L every time the inspection target 4 rotates once, the plural pieces of images in which various fringe patterns are projected on the inspection target 4 can be obtained. Therefore, the presence or absence of a defect of the inspection target 4 can be judged from the plural pieces of images in which various fringe patterns are projected on the inspection target 4.

In addition, for example, when the image inspection device 1 is applied in the high-dynamic-range rendering, in order to acquire plural pieces of images that have different exposure times, the image processing unit 8 switches an exposure time of the camera 2 at the time of imaging the inspection target 4 every time the inspection target 4 rotates once. If the imaging of the inspection target 4, which is carried out while switching the exposure time of the camera 2 every time the inspection target 4 rotates once, is carried out during the rotation of the inspection target 4 for plural rounds, the plural pieces of images in which the inspection target 4 is projected at various exposure time can be obtained. Therefore, if the plural pieces of images taken at various exposure times are rendered, images suppressing variation of lightness/darkness can be obtained.

In addition, for example, if a focus location of a lens of the camera 2 at the time of imaging the inspection target 4 is switched every time the inspection target 4 rotates once, and the plural pieces of images taken at various focus locations are rendered, images with wide depth of field can be obtained, or distances can be estimated by a focusing method.

Figure 5:
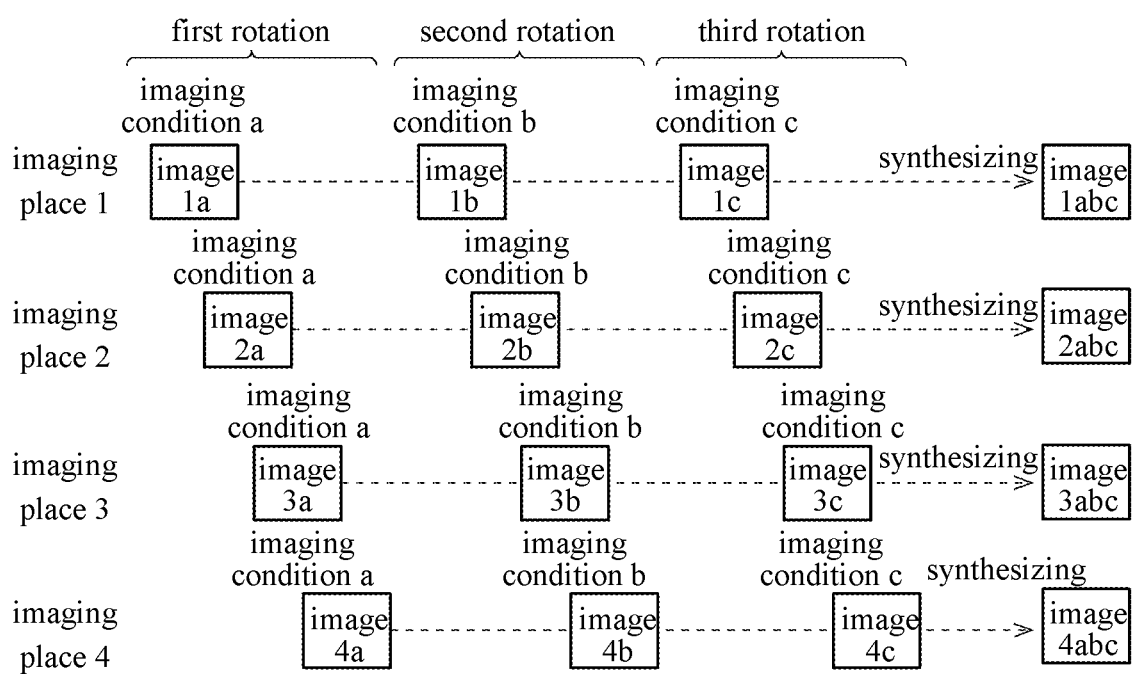
FIG. 5 is a diagram reflecting a situation of an image processing when an appearance of an inspection target is imaged from 4 positions with 3 pieces for each position.

FIG. 5 is a diagram reflecting a situation of the image processing when the appearance of the inspection target 4 is imaged from 4 positions with 3 pieces for each position. As described above, for example, when the inspection target 4 is imaged by the camera 2 every time the table 3T rotates 90 degrees, and the imaging is carried out until the inspection target 4 rotates 3 times, as shown in FIG. 5, data of 12 pieces of the images in total is acquired. Therefore, on this occasion, the image processing unit 8 includes, for example, a buffer (an image memory) which has a capacity capable of accumulating the data of the 12 pieces of images acquired by the camera 2. The image processing such as rendering or the like of the data of the images accumulated in the buffer is performed separately in 4 positions.

Furthermore, in the example shown in FIG. 5, for any position of imaging positions 1 to 4, the imaging of the first rotation is carried out in an imaging condition a, the imaging of the second rotation is carried out in an imaging condition b, and the imaging of the third rotation is carried out in an imaging condition c. However, the image inspection device 1 of the embodiment above is not limited to this imaging state, for example, for the third rotation, imaging conditions of any one of the imaging positions may be different from other imaging positions. In addition, the number of the images acquired in each imaging position can also be different according to the imaging position. In addition, rendering methods of the images acquired in each imaging position can also be different according to the imaging position. For example, it is considered that among the images acquired in each imaging position, 4 pieces of images are used to carry out the illumination difference stereo method for any one of the positions, 3 pieces of images are used to carry out the illumination difference stereo for any one of other positions, 5 pieces of images are used to carry out the HDR rendering for any one of other positions, and 4 pieces of images are used to carry out the phase shift method for any one of other positions.

According to the image inspection device 1 of the embodiment above, the inspection target 4 is imaged while being rotated by the table 3T, and thus the images of the inspection target 4 taken from various directions can be obtained. In addition, the inspection target 4 is imaged while maintaining the state of being rotated by the table 3T, and thus the activation and the stop of the drive motor 3M is not required to be repeated, and there is no time loss due to the activation and the stop of the drive motor 3M when the appearance of the inspection target 4 is imaged over the whole periphery. Besides, in the image inspection device 1 of the embodiment above, the imaging is carried out for a plurality of times while changing the imaging conditions at timings when the location relationship of the inspection target 4 and the camera 2 is the same, and thus the image inspection device 1 can be applied in the image inspection using the illumination difference stereo method or the like.

An effect of shortening the inspection time due to not repeating the activation and the stop of the drive motor 3M is verified in the following. For example, an occasion is considered in which the inspection target 4 is imaged from 5 positions with 4 times at each position. The time (exposure+reading out) taken by one imaging is set to 10 ms, and the time taken to rotate the inspection target 4 by the drive motor 3M by one fifth, containing a settling time, is set to 300 ms.

In a comparison example in which the images are taken while the activation and the stop of the drive motor 3M are repeated, time T1 (ms) taken for the imaging of the inspection target 4 is as follows.

$$T1 = 5 \times (300 + 4 \times 10) = 1700$$

On the other hand, when the images are taken while maintaining the state of rotating the inspection target 4 as the image inspection device 1 of the embodiment above, time T2 (ms) taken for the imaging of the inspection target 4 is as follows.

$$T2 = 4 \times 100 = 400$$

That is, it is known that compared with the comparison example in which the images are taken while repeating the activation and the stop of the drive motor 3M, the time required can be shorten by more than one fourth when the images are taken while maintaining the state of rotating the inspection target 4 as the image inspection device 1 of the embodiment above. Furthermore, when a device which automatically conveys the inspection target 4 is arranged by the side of the image inspection device 1, and the inspection target 4 is conveyed to the front of the camera 2 in the state of being placed on the table 3T, compared with an occasion in which the drive motor 3M is activated after the inspection target 4 reaches the front of the camera 2, the time loss can be further reduced by a state in which the inspection target 4 is already rotated at the time of reaching the front of the camera 2.

Variation Example

Figure 6:
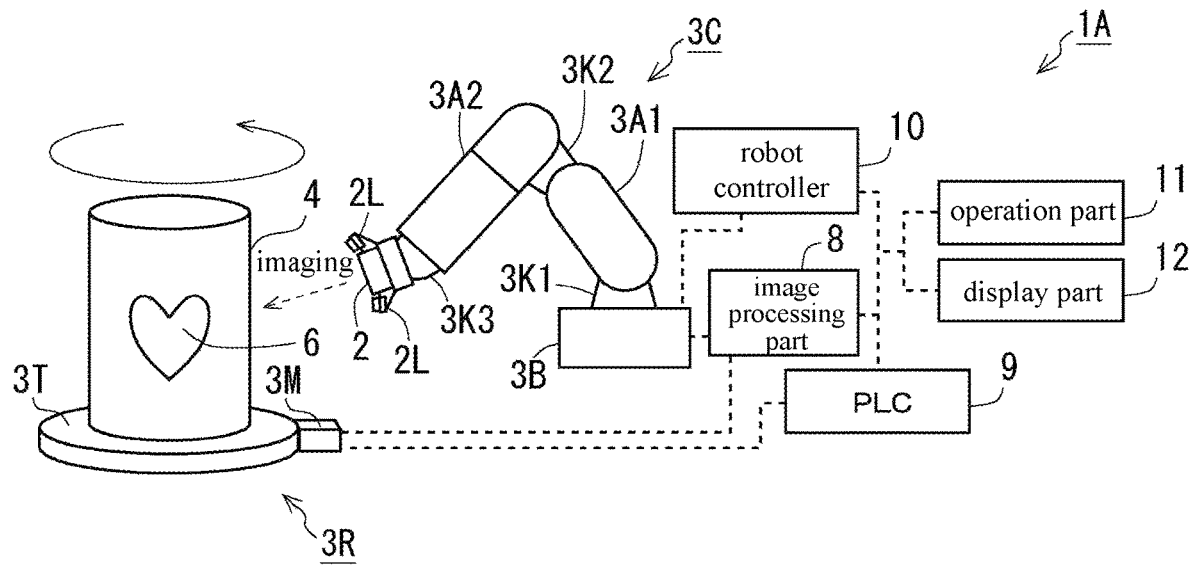
FIG. 6 is a diagram showing an overall configuration of an image inspection device of a variation example.

In the following, a variation example of the image inspection device 1 is described. FIG. 6 is a diagram showing an overall configuration of an image inspection device 1A of the variation example. In the variation example, the camera 2 is provided on a front end of a robot arm 3C.

The robot arm 3C is a so-called articulated robot, and includes a first arm 3A1 which is coupled with a base 3B via a first joint 3K1, and a second arm 3A2 which is coupled with a front end portion of the first arm 3A1 via a second joint 3K2. The camera 2 and the lightings 2L are provided at a front end of the second arm 3A2 via a third joint 3K3. A drive mechanism such as a motor for rotating each arm around an axis of each joint is built in the robot arm 3C and acts in accordance with a command sent from a robot controller 10. The robot controller 10 may be a general-purpose computer which has a CPU, a memory, and an auxiliary storage device or the like, or a control device dedicated to robot.

Action Example 1 of the Variation Example

Figure 7:
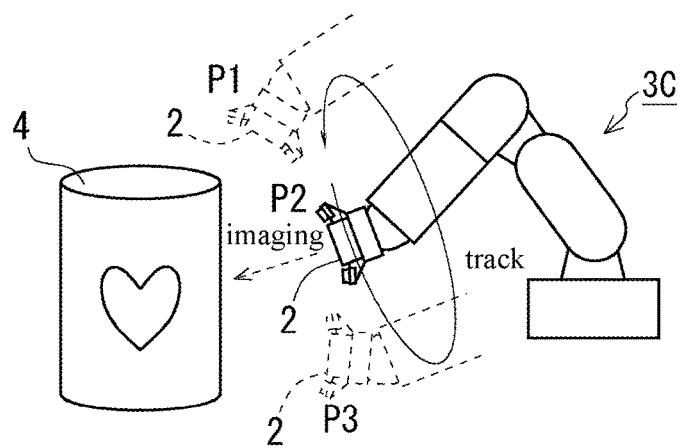
FIG. 7 is a diagram showing a first example of an action of the image inspection device of the variation example.

When the camera 2 is provided on the front end of the robot arm 3C, the location of the camera 2 with respect to the inspection target 4 can be periodically and relatively changed by the robot arm 3C instead of the rotation mechanism 3R. FIG. 7 is a diagram showing a first example of an action of the image inspection device 1A of the variation example. In the image inspection device 1A, for example, the robot arm 3C is controlled by the robot controller 10 in a manner that the camera 2 periodically circles a predefined circling track, by which the inspection target 4 can also be imaged at determined imaging places P1, P2, P3 on the orbit.

If the image inspection is started in the image inspection device 1A of the variation example, the PLC 9 operates the robot arm 3C by the robot controller 10 in a manner that the camera 2 circles a predefined circling track. If the camera 2 continues to circle the circling track, the location of the inspection target 4 with respect to the camera 2 is periodically and relatively changed. During an operation of the robot arm 3C, location information of the camera 2 is output from the robot controller 10 to the PLC 9. In the PLC 9, whether the camera 2 arrives at the imaging places P1, P2, P3 is judged based on the location information of the camera 2 sent from the robot controller 10, and an imaging command to the camera 2 is carried out in accordance with the timing when the camera 2 arrives at any of the imaging places.

According to the image inspection device 1A of the variation example, images are taken while moving the camera 2 by the robot arm 3C in a manner that the camera 2 periodically circles the predefined circling track, and thus the images in which the inspection target 4 is imaged from various imaging places on the circling track can be obtained. In addition, images are taken while maintaining the state of moving the camera 2 by the robot arm 3C, and thus the activation and the stop of the robot arm 3C are not required to be repeated, and there is no time loss due to the activation and the stop of the drive motor 3M when the inspection target 4 is imaged from various imaging places. Besides, in the image inspection device 1A of the variation example, at the timings when the location relationship between the inspection target 4 and the camera 2 is the same, the imaging is carried out plural times while changing the imaging conditions such as a light emission state of the lightings 2L, and thus the image inspection device 1A can be applied in the image inspection using illumination difference stereo method or the like.

Action Example 2 of Variation Example

Figure 8:
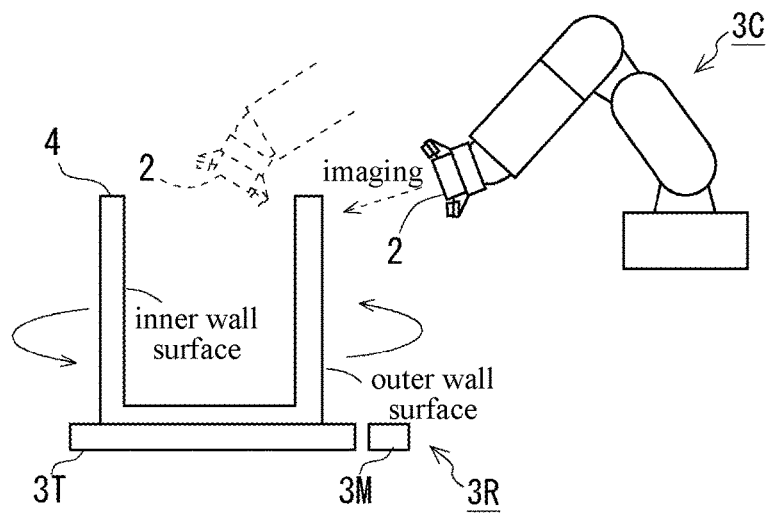
FIG. 8 is a diagram showing a second example of an action of the image inspection device of the variation example.

In addition, the rotation mechanism 3R and the robot arm 3C can also be used in combination in the image inspection device 1A of the variation example. FIG. 8 is a diagram showing a second example of the action of the image inspection device 1A of the variation example. In the image inspection device 1A, for example, when the imaging of the inspection target 4 is carried out while the drive motor 3M of the rotation mechanism 3R is activated to rotate the table 3T, the location of the camera 2 can also be changed by the robot arm 3C. If the images are taken while the location of the camera 2 is changed by the robot arm 3C, for example, when the inspection target 4 is a hollow object, not only an outer wall surface, but also an inner wall surface of the inspection target 4 can be imaged by moving the location of the camera 2 in a manner that the inner wall surface is observed from an opening portion of the inspection target 4. Furthermore, in the image inspection device 1A, one or a plurality of cameras 2 fixed near the rotation mechanism 3R may be provided separately from the camera 2 provided on the front end of the robot arm 3C.

Action Example 3 of the Variation Example

In addition, in the image inspection device 1A of the variation example, the periodic and relative changes of the location of the camera 2 with respect to the inspection target 4 can also be realized by combining a movement of the camera 2 caused by the robot arm 3C and a rotation of the inspection target 4 caused by the rotation mechanism 3R.

Figure 9:
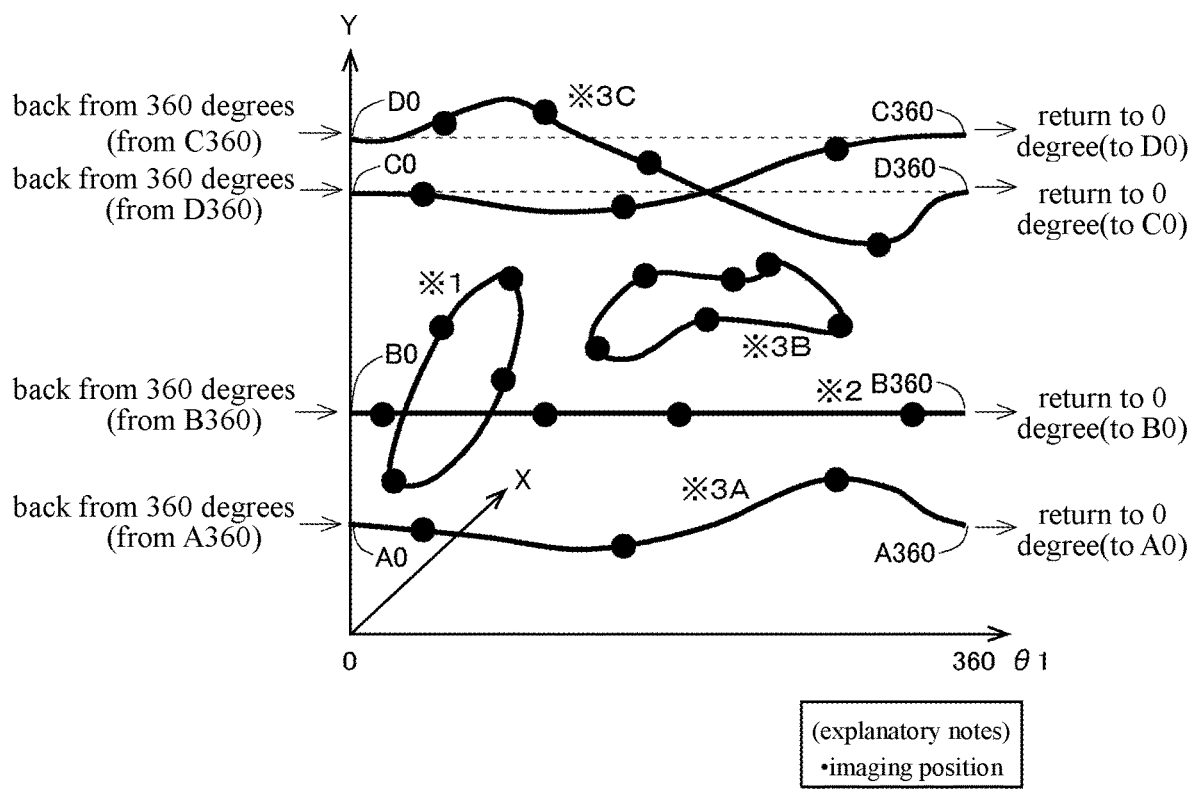
FIG. 9 is a diagram illustrating tracks of periodic and relative changes of a location of a camera with respect to an inspection target which can be realized by action examples 1 to 3.
Figure 10:
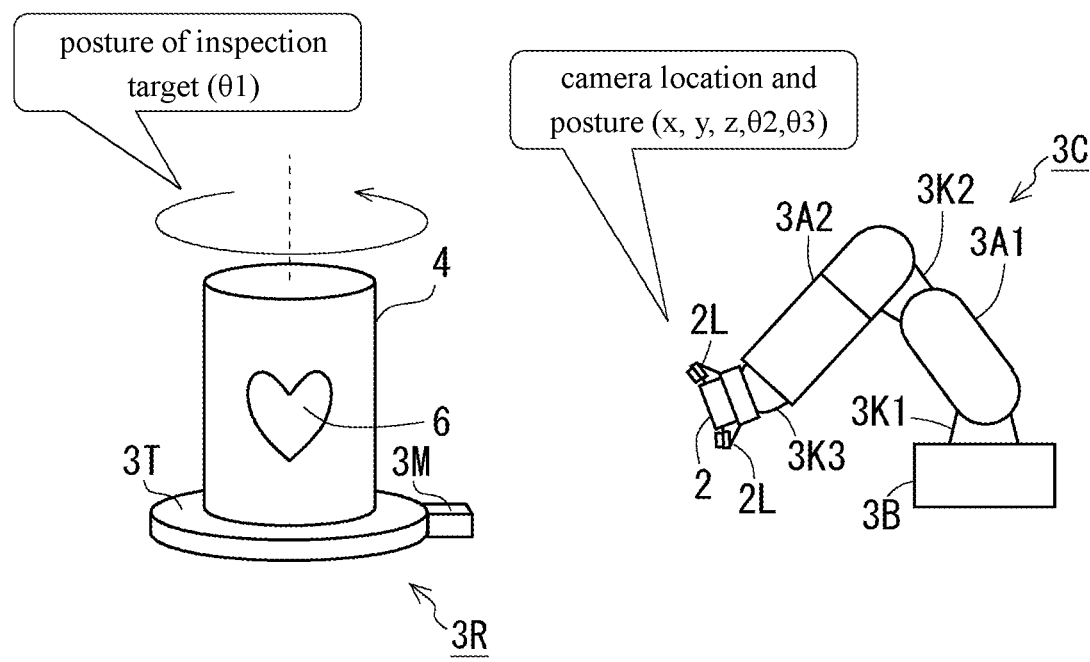
FIG. 10 is a diagram that supplements description of each parameter of FIG. 9.

FIG. 9 is a diagram illustrating tracks of periodic and relative changes of the location of the camera 2 with respect to the inspection target 4, which can be realized by the action examples 1 to 3. In addition, FIG. 10 is a diagram that supplements the description of each parameter of FIG. 9. In FIG. 9, the relative location relationship between the camera 2 and the inspection target 4 is illustrated by a multidimensional space. Besides, in FIG. 10, parameters representing the location and a posture of the camera 2 and a posture the inspection target 4 are shown. As shown in FIG. 10, when the rotation mechanism 3R has one degree of freedom and the robot arm 3C moving the camera 2 has five degrees of freedom, the relative location relationship between the camera 2 and the inspection target 4 can be expressed by 6 parameters (X, Y, Z, θ1, θ2, θ3) in total, including one rotation parameter (θ1) that represents the posture of the inspection target 4 and other 5 parameters (X, Y, Z, θ2, θ3) that represent the location and the posture of the camera 2. Therefore, in FIG. 9, in theory, all the parameters should be represented in a diagram which represents the multidimensional space showing the relative location relationship between the camera 2 and the inspection target 4. However, the dimension number of the multidimensional space which can be shown in the diagram is at most 3, so that in FIG. 9, X, Y and θ1 are representatively selected as 3 parameters which can be shown in the 3-dimensional space, and X and Y are set as 2 axes orthogonal to an axis of θ1 which is set as a horizontal axis. However, the multidimensional space which shows the relative location relationship between the camera 2 and the inspection target 4 is not limited to this, and any one of the 6 parameters (X, Y, Z, θ1, θ2 and θ3) can be set as the 3 axes shown in FIG. 9. Furthermore, the 6 parameters are necessary and sufficient degrees of freedom for representing the relative location relationship between the camera 2 and the inspection target 4; however, for example, when the robot arm 3C has more than 6 degrees of freedom or the rotation mechanism 3R has more than 2 degrees of freedom, the relative location relationship between the camera 2 and the inspection target 4 is expressed by more than 7 parameters. In addition, for example, when the robot arm 3C has less than 4 degrees of freedom, the relative location relationship between the camera 2 and the inspection target 4 is expressed by less than 5 parameters. That is, the image inspection device 1A of the variation example is not limited to the image inspection device capable of changing the relative location relationship between the camera 2 and the inspection target 4 by 6 degrees of freedom in total as shown in FIG. 10, and may be, for example, the image inspection device capable of changing the relative location relationship between the camera 2 and the inspection target 4 by degrees of freedom of less than 5 in total or more than 7 in total.

A track shown by "※1" in FIG. 9 shows one example of the track which can be realized by the above-described <action example 1 of the variation example>. In addition, the track shown by "※2" in FIG. 9 shows one example of the track which can be realized by the image inspection device 1 of the above-described embodiment. In addition, the tracks shown by "※3A", "※3B", "※3C" in FIG. 9 show one example of the tracks which can be realized by the above-described <action example 2 of the variation example> or <action example 3 of the variation example>.

The track shown by "※3C" in FIG. 9 shows one example of the track which goes through one period by the inspection target 4 rotating twice. The track which can be realized by the above-described <action example 2 of the variation example> or <action example 3 of the variation example> can also be the track which goes through one period by the inspection target 4 rotating twice or more than three times.

In addition, the track shown by "※3B" in FIG. 9 can also be in a location crossing a boundary of 0 degree (360 degrees) in the horizontal axis of FIG. 9. When the track shown by "※3B" crosses the boundary of 0 degree (360 degrees), a portion of a circling annular track is shown near 0 degree in the horizontal axis of FIG. 9, and the other portions of the circling annular track are shown near 360 degrees in the horizontal axis of FIG. 9. In addition, the track shown by "※3B" in FIG. 9 can also cross more than 360 degrees in the horizontal axis of FIG. 9.

In the above-described <action example 1 of the variation example>, the rotation mechanism 3R is not used in combination and the camera 2 is moved only by the robot arm 3C. Therefore, on this occasion, as the track of the periodic and relative changes of the location of the camera 2 with respect to the inspection target 4, a planar track which can be realized by the action of the rotation mechanism 3R, that is, for example the track as shown by "※1" in FIG. 9 can be drawn.

In addition, there is no robot arm 3C in the image inspection device 1 of the above-described embodiment, and thus the location of the camera 2 with respect to the inspection target 4 is only changed by the rotation mechanism 3R. Therefore, on this occasion, a track of the periodic and relative changes of the location of the camera 2 with respect to the inspection target 4 is a straight track which can be realized by the action of the rotation mechanism 3R, that is, for example the track as shown by "※2" in FIG. 9.

In addition, in the above-described <action example 2 of the variation example> and <action example 3 of the variation example>, the robot arm 3C and the rotation mechanism 3R are used in combination, and thus various tracks can be drawn. Therefore, on this occasion, as the track of the periodic and relative changes of the location of the camera 2 with respect to the inspection target 4, for example, the track which circles by the continuous rotation of the rotation mechanism 3R in a fixed direction or an endless track which is locally realized by the slight rotation of the rotation mechanism 3R in two directions can be drawn.

<Recoding Medium Readable by a Computer>

The programs which make a computer and other machines and devices (hereinafter referred to as "computer or the like") realize any one of the aforementioned processings can be recorded in a recording medium which is readable by the computer or the like. Besides, the function of the programs can be provided by making the computer or the like read and implement the programs of the recording medium.

Here, the recoding medium readable by the computer and the like is a recoding medium which can accumulate data or information of the programs or the like by an electrical, magnetic, optical, mechanical, or chemical action and read the data or the information of the programs or the like from the computer or the like. The recording media in this kind of recording medium which can be removed from the computer or the like may be, for example, a flexible disk, a magneto-optical disk, a CD-ROM, a CD-R/W, a DVD, a Blu-ray disk (Blu-ray is a registered trademark), a DAT, an 8 mm tape, a memory card such as a flash memory or the like, and so on. In addition, the recoding medium fixed to the computer or the like may be a hard disk, an SSD, or an ROM (read only memory) or the like.

Furthermore, the aforementioned embodiment and variation example are one example of embodiments of the disclosure, and the technical scope disclosed in the application is not limited in the aforementioned embodiment and variation example.

What is claimed is:

1. An image inspection device, which inspects an inspection target by images, comprising:
    an imaging part, which images the inspection target;
    a changing part, which makes a location of the inspection target with respect to the imaging part periodically and relatively change; and
    a control part, which makes the imaging part image the inspection target in a manner that a plurality of images having different imaging conditions are acquired at a plurality of timings which is periodically repeated due to the relative changes and at which the inspection target is in a predefined location with respect to the imaging part, and wherein the plurality of images are continuously acquired at each of the plurality of timings while changing the imaging condition,
    wherein after the control part makes the imaging part image the inspection target so as to acquire a first image which captures the inspection target in the relative changes, when the location of the inspection target with respect to the imaging part is changed by the changing part to the same predefined location as the time when the first image is taken, the control part makes the imaging part image the inspection target so as to acquire a second image which captures the inspection target in the relative changes in imaging conditions different from the conditions under which the first image is taken.

2. The image inspection device according to claim 1, wherein
    the changing part makes the location of the inspection target with respect to imaging part periodically and relatively change by making the inspection target rotate.

3. The image inspection device according to claim 1, wherein
    the changing part makes the location of the inspection target with respect to imaging part periodically and relatively change by making the inspection target rotate.

4. The image inspection device according to claim 1, wherein
    the changing part outputs signals showing the location of the inspection target with respect to the imaging part; and
    the control part makes the imaging part image the inspection target so as to acquire the plurality of images having different imaging conditions at the timings determined based on the signals output by the changing part.

5. The image inspection device according to claim 1, wherein
    the changing part outputs signals showing the location of the inspection target with respect to the imaging part; and
    the control part makes the imaging part image the inspection target so as to acquire the plurality of images having different imaging conditions at the timings determined based on the signals output by the changing part.

6. The image inspection device according to claim 1, further comprising
    an inspection part, which inspects the inspection target using the plurality of images acquired by the imaging part.

7. The image inspection device according to claim 1, further comprising
    an inspection part, which inspects the inspection target using the plurality of images acquired by the imaging part.

8. The image inspection device according to claim 1, wherein
    the imaging conditions comprise at least any one of an irradiation pattern of lightings, a focus location of a lens of the imaging part, and an exposure time of the imaging part.

9. The image inspection device according to claim 1, wherein
    the imaging conditions comprise at least any one of an irradiation pattern of lightings, a focus location of a lens of the imaging part, and an exposure time of the imaging part.

10. An image inspection method, which inspects an inspection target by images, comprising:
    a changing process, in which a location of the inspection target with respect to an imaging part which images the inspection target is periodically and relatively changed; and
    a control process, in which the imaging part is made to image the inspection target so as to acquire a plurality of images having different imaging conditions at a plurality of timings which is periodically repeated due to the relative changes and at which the inspection target is in a predefined location with respect to the imaging part, and wherein the plurality of images are continuously acquired at each of the plurality of timings while changing the imaging condition,
    wherein after the control process makes the imaging part image the inspection target so as to acquire a first image which captures the inspection target in the relative changes, when the location of the inspection target with respect to the imaging part is changed by the changing process to the same predefined location as the time when the first image is taken, the control process makes the imaging part image the inspection target so as to acquire a second image which captures the inspection target in the relative changes in imaging conditions different from the conditions under which the first image is taken.

11. A non-transitory computer-readable medium comprising an image inspection program, which inspects an inspection target by images and makes a computer implement:
    a changing process, in which a location of the inspection target with respect to an imaging part which images the inspection target is periodically and relatively changed; and
    a control process, in which the imaging part is made to image the inspection target so as to acquire a plurality of images having different imaging conditions at a plurality of timings which is periodically repeated due to the relative changes and at which the inspection target is in a predefined location with respect to the imaging part, and wherein the plurality of images are continuously acquired at each of the plurality of timings while changing the imaging condition, wherein after the control process makes the imaging part image the inspection target so as to acquire a first image which captures the inspection target in the relative changes, when the location of the inspection target with respect to the imaging part is changed by the changing process to the same predefined location as the time when the first image is taken, the control process makes the imaging part image the inspection target so as to acquire a second image which captures the inspection target in the relative changes in imaging conditions different from the conditions under which the first image is taken.

* * * * *